Nov. 17, 1936.   J. E. LOVELY   2,061,311
MACHINE TOOL
Filed Dec. 20, 1934   5 Sheets-Sheet 1

Inventor
John E. Lovely
by Wright, Brown, Quinby & May
Attys.

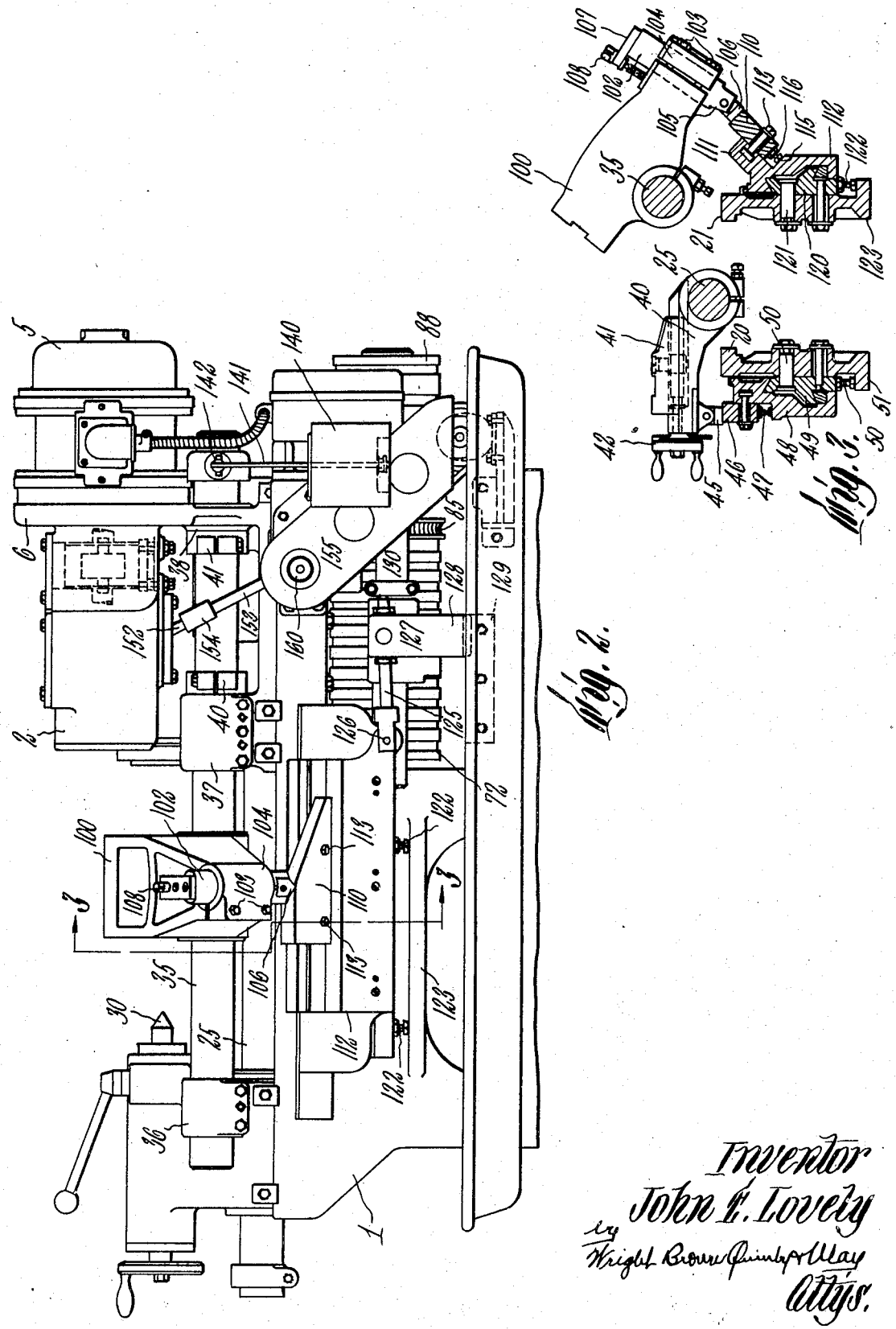

Nov. 17, 1936.  J. E. LOVELY  2,061,311
MACHINE TOOL
Filed Dec. 20, 1934  5 Sheets-Sheet 3

Inventor
John E. Lovely
by Wright Brown Quinby & May
attys.

Nov. 17, 1936.  J. E. LOVELY  2,061,311
MACHINE TOOL
Filed Dec. 20, 1934    5 Sheets-Sheet 4
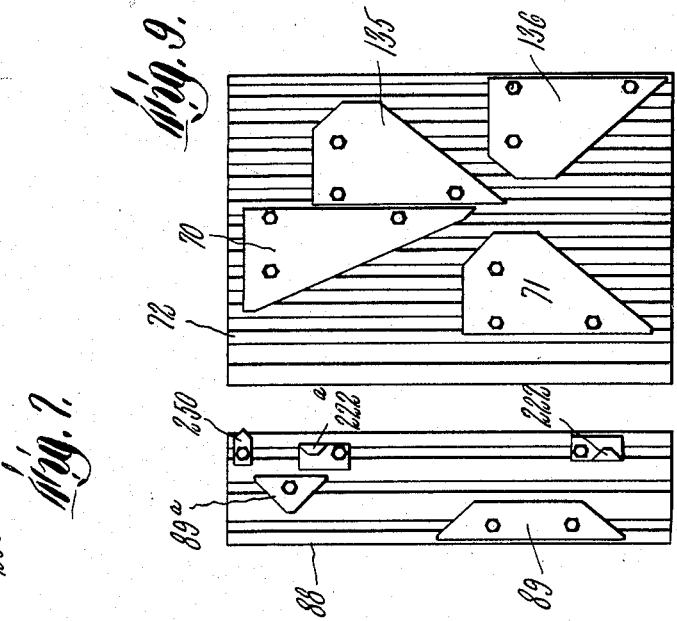
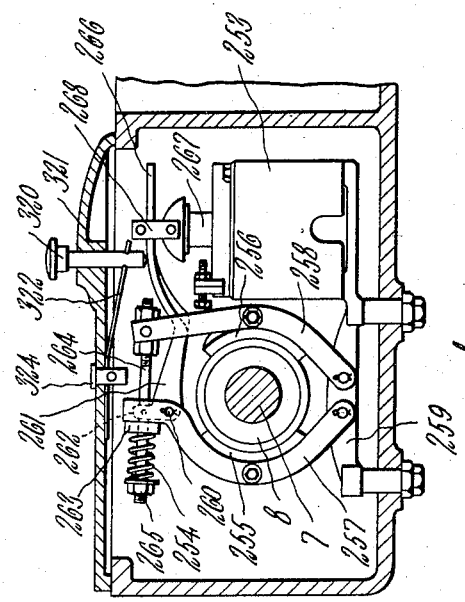
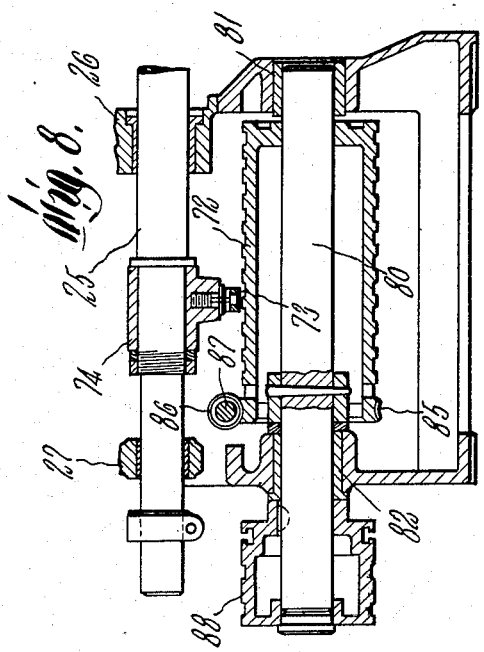
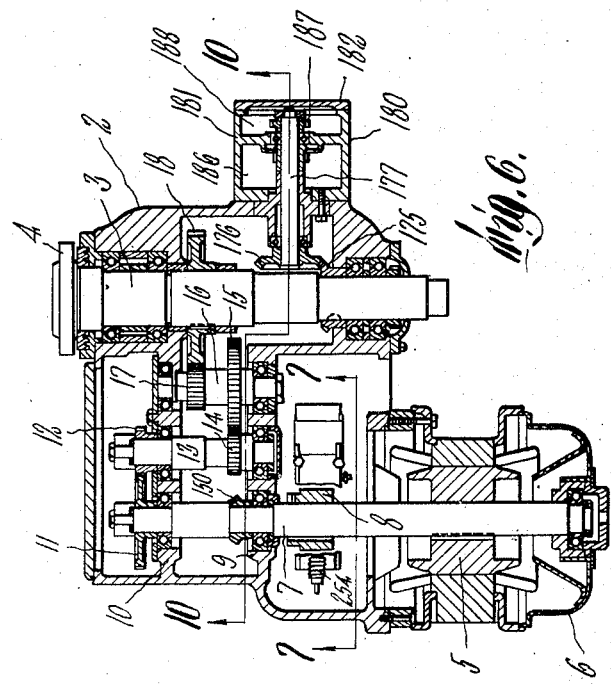
Inventor
John E. Lovely
by Wright Brown Quinby & May
attys.

Nov. 17, 1936.　　　　J. E. LOVELY　　　　2,061,311
MACHINE TOOL
Filed Dec. 20, 1934　　　5 Sheets-Sheet 5

Inventor
John E. Lovely
by Wright, Brown, Quinby & May
attys.

Patented Nov. 17, 1936

2,061,311

UNITED STATES PATENT OFFICE 2,061,311

MACHINE TOOL

John E. Lovely, Springfield, Vt., assignor to Jones & Lamson Machine Company, Springfield, Vt., a corporation of Vermont Application December 20, 1934, Serial No. 758,454

10 Claims. (Cl. 82—2)

This invention relates to machine tools, and more particularly to such tools of the lathe type, and has for an object to produce a small high speed machine automatic in action during its entire cycle.

A further object is to produce such a machine with an electrical control of its starting and stopping.

Another object is to provide such a machine which may, if desired, be started and stopped at will regardless of the position in which it may be in its cycle. This facilitates adjustment of the parts in setting up the machine for a particular piece of work.

Still another object is to provide such a machine in which the automatic controls effected by cams on a rotary cam drum are driven from the headstock through simple and effective mechanism particularly suitable for a small machine and including change gears in the working or low speed connections.

A further object is to provide for automatic braking of the machine as soon as the driving power is shut off and with provision by which the brake may be released easily when it is desired to turn the machine over by hand.

Further objects and advantages will appear from a more complete description of an embodiment of the invention shown in the accompanying drawings in which Figure 1 is a front elevation of the machine.

Figure 2 is a rear elevation of the same.

Figure 3 is a detail section on line 3—3 of Figure 2.

Figure 6 is a detail section on line 6—6 of Figure 4.

Figure 7 is a detail section on line 7—7 of Figure 6.

Figure 8 is a detail section on line 8—8 of Figure 4.

Figure 9 is a developed view of the controlling cam drum shown best in Figure 8 and certain cams thereon.

Figure 1:
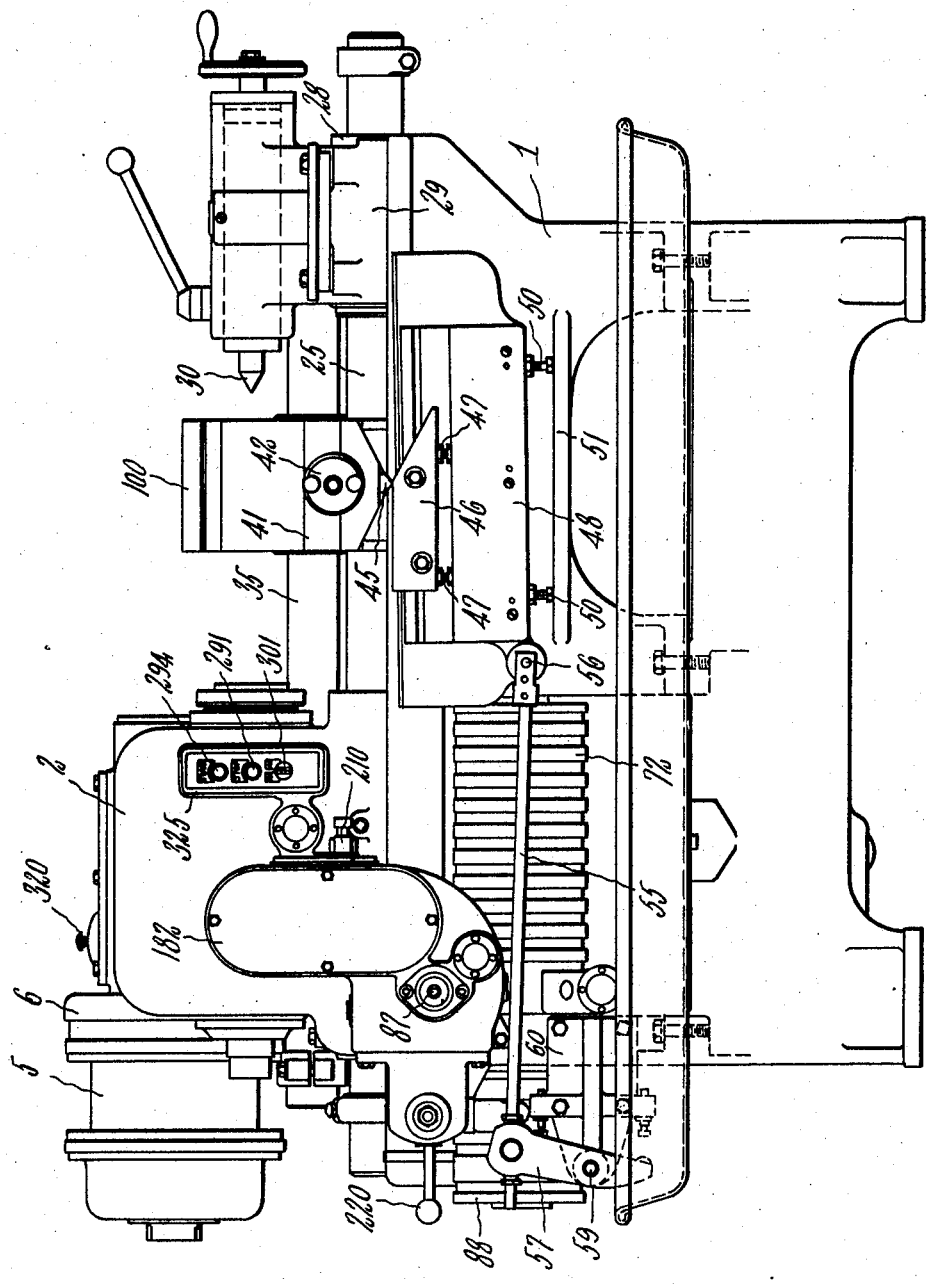

Referring to the drawings, the machine as shown comprises a bed 1 at one end of which is a headstock 2. Journaled in this headstock, as shown in Figure 6, is a work spindle 3 having a spindle nose 4, to which may be attached any suitable type of work holder such as a chuck of any convenient type.

This work spindle is arranged to be driven by a motor 5 provided with a casing 6, which may be secured directly to the headstock in any suitable way. This motor 5 has an armature shaft 7 which extends into the headstock casing and has a portion provided with a brake drum 8. Beyond this brake drum and within the headstock, the armature shaft passes through bearings 9 and 10, and forwardly of the bearings 10 it carries a gear 11, which meshes with a pinion 12 on a shaft 13. This shaft 13 carries a pinion 14 which meshes with the gear 15 carried by a shaft 16. The shaft 16 also carries a pinion 17 which meshes with a ring gear 18 secured in any suitable way to the spindle 3. The spindle is thus rotated through a train of gears from the motor 5.

Between front and rear side frame members 20 and 21 is arranged a rockable and axially movable tool bar 25. This tool bar is shown as positioned directly beneath the spindle 3 and somewhat above the upper edge of the back frame member 21. It is supported at the headstock end in spaced bearings 26 and 27 of the headstock, as shown in Figure 8, and at its rear end it is slidably journaled in a bearing 28 in the tailstock 29 (Figure 1). The tailstock supports the usual dead center 30 which may be adjustable axially within the tailstock toward or from the headstock, and be clamped in adjusted position, as is well understood in the art.

A second tool bar 35 is arranged over the back bed frame member 21, and is shown in Figure 2 as journaled in bearings 36, 37 and 38 arranged along its length. As also shown in Figure 2, it may be prevented from having axial movement as by collars 40 and 41, which may be clamped thereto between the bearings 37 and 38.

The front tool bar 25, as best shown in Figure 3, has clamped thereto a tool carrier 40 which may have a tool slide 41 mounted thereon for sliding movement transverse to the length of the tool bar 25. Suitable means for traversing the carriage 41 in this direction may be employed, such as the hand feed wheel shown at 42 in Figures 1 and 3. This is all as is well known in the art.

The angular position of the carrier arm 40 may be determined by the engagement of a shoe 45 thereon on a former cam 46. This former cam may be supported on the adjusting jacks 47 from a slide 48, which, in turn, may be mounted to slide along a track member 49 pivoted at 50 to the front frame member 20, so that the track member may be adjusted angularly. Such adjustment may be effected by the adjusting jacks 50 placed between opposite end portions of the track member 49 and resting upon a supporting rib 51 of the frame 20. The slide 48 may be moved by a link 55 pivoted thereto at 56 and having its rear end secured to a rock arm 57 fulcrumed at 59 on a bracket member 60 secured to the machine frame. The rock arm 57 is actuated in a manner presently to be described.

Axial movement of the tool bar 25 is produced as shown in Figures 8 and 9 by suitable cams 70 and 71 secured to the periphery of a cam drum 72. These cams act upon a follower roll 73 carried by a member 74 clamped to the tool bar 25. The drum 72 is secured to a shaft 80 journaled at 81 and 82 in end portions of the bed frame directly beneath the headstock and nearly in the axial plane of the tool bar 25 and the spindle 3. The bearing 81 is nearly in vertical alinement with the spindle nose 4 and since the shaft 80 does not extend therebeyond, a free open space beneath the work is left between the bed frame side members 20 and 21 for receiving chips. The drum 72 is provided with a worm gear portion 85 with which meshes a worm 86 on a transverse drive shaft 87. The means for driving this shaft will be later described. The shaft 80 extends beyond the bearing 82 and has secured thereon, outwardly of this bearing, a second cam drum 88. On the cam drum 88 are two cams 89 and 89a (see Figure 9) with which a cam roll 90 on the inner face of the arm 57 cooperates to effect swinging of this arm with consequent motion of the slide 48. Thus the axial and angular motions of the tool bar 25 are controlled so as to control the motions of one or more tools (not shown) carried by the carriage 41.

Figure 5:
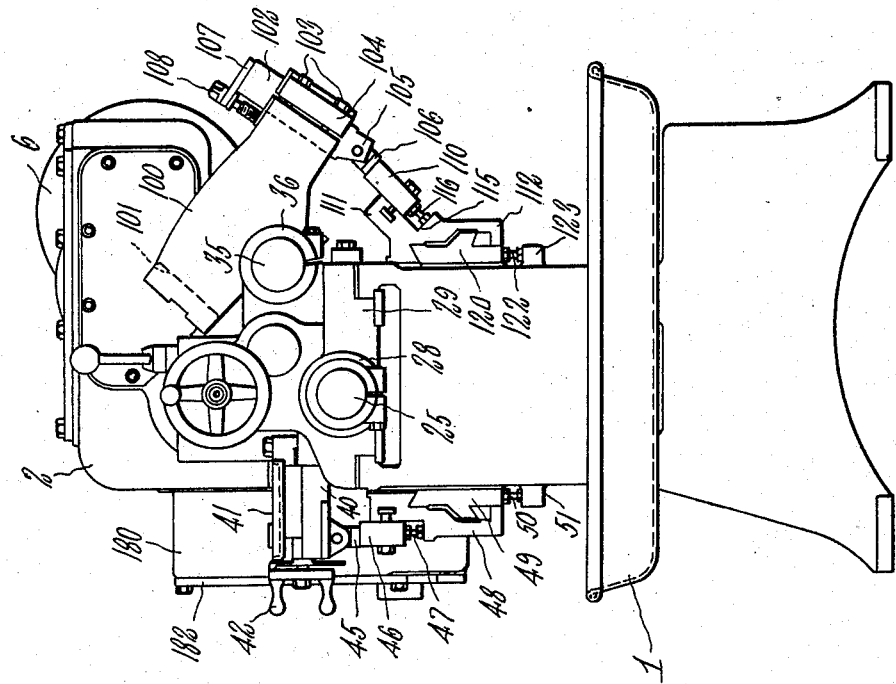
Figures 4 and 5 are head and tailstock end elevations, respectively, of the machine.

The back tool bar 35 has clamped thereto an arm 100 which has at one end suitable ways 101 (see Figure 5) for adjustable securement thereto of a second tool-carrying member. Passed transversely through the back portion of this arm 100 is a bar of circular cross section 102 which may be clamped in position, as by clamp screws 103, engaging opposite sides of a split bearing 104 through which the bar 102 extends. The lower end of this bar 102 is formed with a pair of jaws 105 between which is pivoted a shoe 106. To the upper end of the bar 102 a plate 107 is secured through which is passed an adjusting screw 108 bearing against the top face of the arm 100, whereby the lengthwise position of the bar 102 may be adjusted when it is released from the clamp 104, thus to adjust the angular position of the arm 100 for any given position of the shoe 106. This shoe 106 bears on the upper edge of a former cam 110, which may be secured to a plate portion 111 of a slide 112, as by bolts 113, and be adjustably spaced from a shoulder 115 on the slide adjacent opposite ends by adjustable jacks 116, similar to those employed for adjusting the front former cam 46. The slide 112 is mounted on a track member 120 pivotally mounted on the rear face of the back frame 21, as by means of the pivot 121, and adjustable angularly about this pivot by the jacks 122 positioned between the lower face of the track 120 and a rib 123 integral with wall member 21.

The slide 112 is arranged to be moved lengthwise of the trackway 120 and for this purpose a link 125 is pivoted as at 126 (see Figure 2) to an end portion of the slide and at its other end it engages a slide 127 having a forked lower end 128 riding along a guide rail 129 fixed to the bed of the machine. The slide 127 is supported for longitudinal motion on a bar 130 and is provided with a suitable follower (not shown) which is engaged by cams 135 and 136 secured to the cam drum 72. The shoe 106 is held down against the former cam 110 by any suitable means, such as the weight 140 suspended by a link 141 to an arm 142 secured to one end portion of the tool bar 35.

Figures 10, 11, 12:
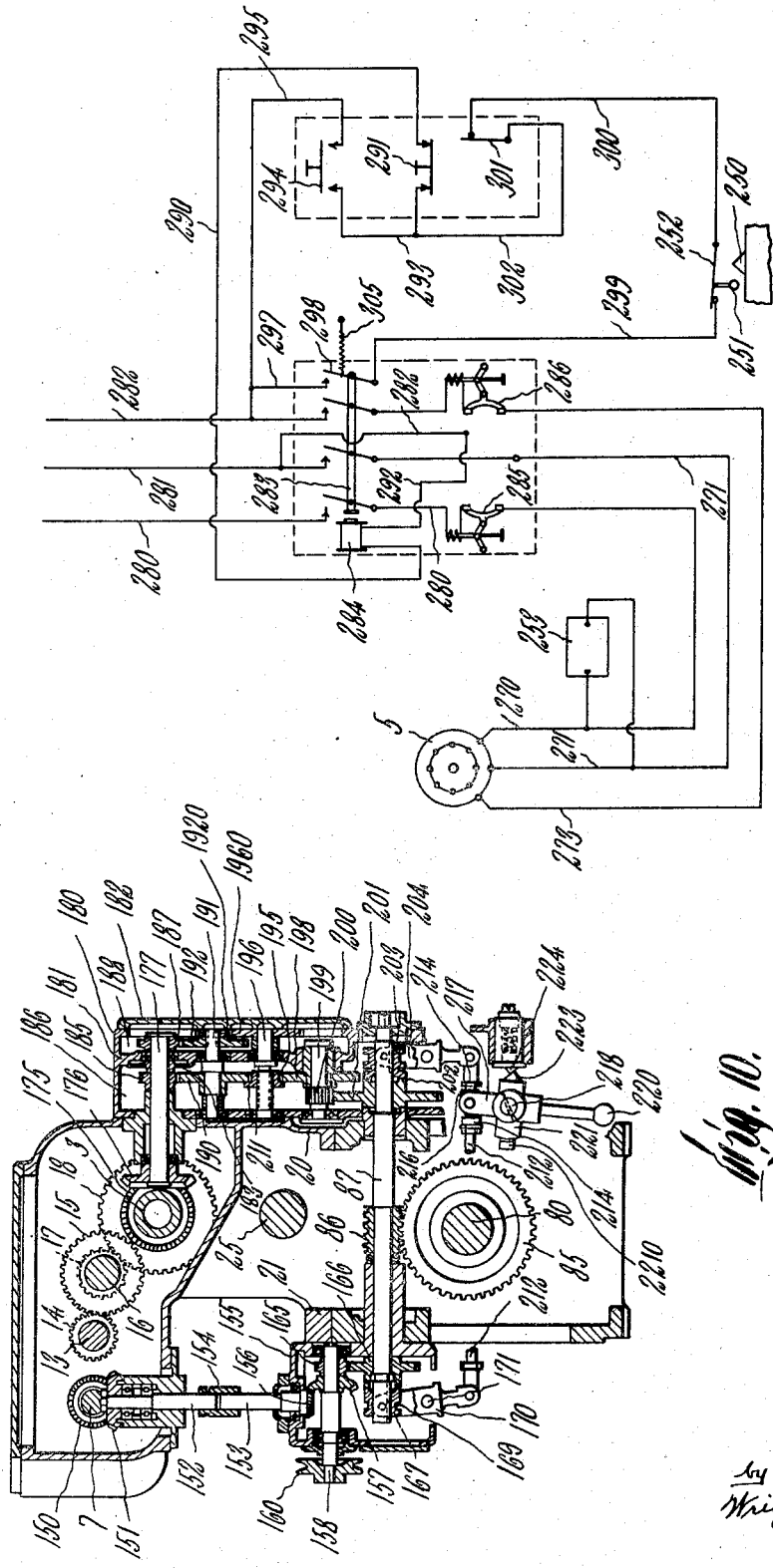
Figure 10 is a diagrammatic detail section on line 10—10 of Figure 6.
Figure 11 is a sectional detail of a clutch member.
Figure 12 is a wiring diagram of the electrical controls.

As shown best in Figure 10, the cam drums 72 and 88 are arranged to be rotated by rotation of the shaft 87 by either selected of a pair of mechainsms, one of which is a high speed drive used primarily for the idle motions of the machine, and the other a low speed drive used primarily for working motions of the tools. The high speed drive is taken from the motor shaft 7 to which is secured a bevel pinion 150. This bevel pinion meshes with a similar pinion 151 secured to a shaft 152, which extends downwardly and toward the headstock end of the machine, and is connected to an alined shaft 153, as by means of a coupling 154. This shaft 153 extends into the upper end of an inclined gear casing 155. Within this casing it carries a bevel pinion 156 which meshes with a similar pinion 157 on a horizontal shaft 158. This shaft 158 extends through the back face of the casing 155 where it is shown as carrying a grooved belt pulley 160. A belt may be passed over this grooved pulley 160 and to the shaft of a suitable coolant pump (not shown) by which coolant may be directed onto the tools where they are cutting the work in a manner well known. The shaft 158 within the casing 155 carries a pinion 165 which meshes with a gear 166 journaled on the shaft 87. It may be clutched to this shaft by means of a clutch collar 167 keyed to the shaft 87 and provided with a peripheral groove 169 in which may be engaged the forked extremity of a shifter lever 170 fulcrumed at 171.

A low speed drive for the shaft 86 is shown as taken from the spindle 3. This spindle, as shown in Figures 6 and 10, carries a bevel gear 175 with which meshes a similar bevel gear 176 on a horizontal shaft 177 which projects forwardly out through the headstock and into the gear casing 180. As shown this gear casing has a partition 181 which divides it into a pair of gear compartments, the outer of which is open at its forward face but is normally covered by a cover plate 182. The shaft 177 carries a loose pinion 185 in the inner compartment 186 and a fixed pinion 187 in the outer compartment 188. The pinion 185 meshes with a gear 190 loose on the shaft 191 which extends through both compartments, and in the outer compartment this shaft 191 carries a fixed gear 192 which meshes with the pinion 187. The shaft 191 also carries a pinion 1920 which meshes with a gear 1960 on a shaft 196. This shaft also has slidably keyed thereto a pinion 195. The pinion 195 normally meshes with the loose gear 190 and also with a gear 198 fixed to a shaft 199. The shaft 199 carries a fixed pinion 200 which meshes with a gear 201 loose on the shaft 87. The gear 201 has a clutch face 202 with which may engage a clutch collar 203 slidably keyed to the shaft 87 and arranged to be shifted by a shifter lever 204. Thus through this chain of gears the shaft 87 may be driven at a relatively low rate of speed. The gears 187, 192, 1920 and 1960 are change gears so as to permit a wide adjustment of the speed at which the shaft 87 is rotated by rotation of the shaft 177. The gears 190 and 185 being rotated by gear 195 carry lubricant to the upper part of the casing and throw some of it into the lubricant-receiving channel 183 from which it is directed to desired points.

It may be desirable at certain times to interrupt this train of gearing and this may be done by shifting the pinion 195 out of engagement with the gears 190 and 198. This may be done by rocking a crank arm 210 on the side face of the gear casing 180, which is secured to a rock shaft extending into the casing and having a shifter finger (not shown) engaging a flange 211 on the pinion 195.

Figure 4:
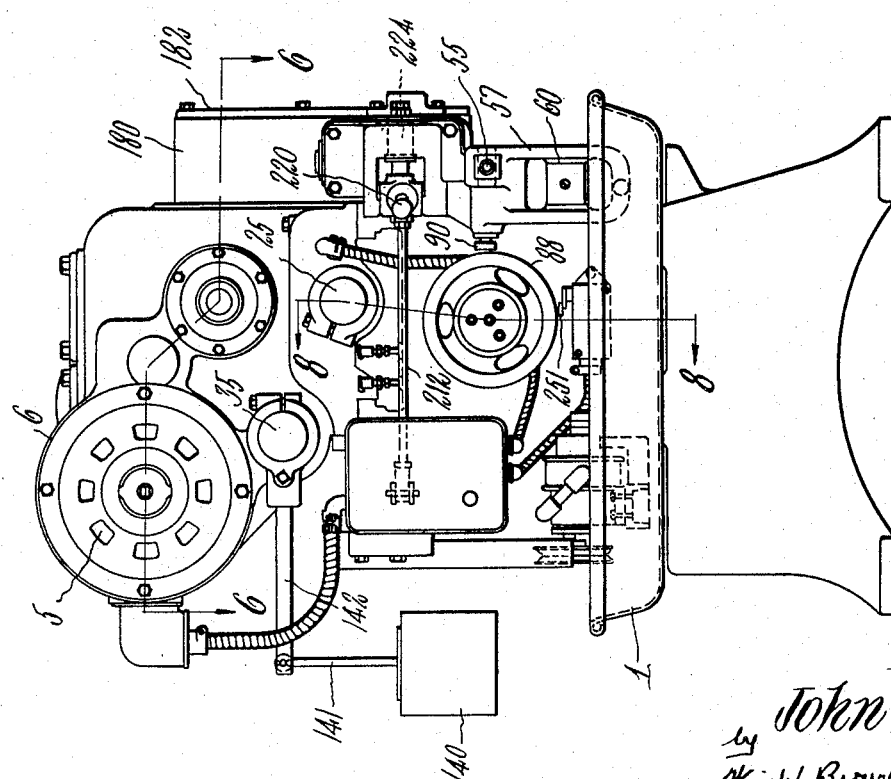

It is also desirable that either the high speed or the low speed drive for the cam drums 72 and 88 be connected at all times during normal operation of the machine, and means are therefore provided by which the low speed drive clutch collar 203 is moved out of clutching engagement with the gear 201 by the overrunning effect of the shaft 87 when the high speed clutch 167 is thrown into mesh with the gear 166, so that there is no time at which both high and low speed clutches are out of driving relation to the shaft 57 during operation of the machine. To this end the collar clutch 203 may be constructed as shown in Figure 11, having two parts 203a and 203b normally pressed apart by springs as 210. The part 203a carries ratchet clutch teeth which engage the corresponding teeth on the gear 201, while the part 203b is provided with a peripheral groove 211 in which engages the parts of the shifter element 204. The shift levers 204 and 170 are shown as connected together by a link 212 pivoted to each, and having a pair of spaced collars 214 thereon between which is slidably mounted an intermediate collar 216 to which is secured an arm 217 carried by a rocking actuator shaft 218. This shaft carries an actuating handle 220 (see Figures 4 and 10) and it also carries a cam follower lever 221 (Figure 10), which may be actuated to turn the rock shaft in opposite directions by cams 222 and 222a on the cam drum 88 as shown diagrammatically in Figure 10. The rock shaft 218 is provided with one element 223 of a load and fire mechanism, the cooperating member being in the form of a spring pressed latch 224 carried by a fixed portion of the frame. Due to the relatively slow motion of the actuating cam the cam follower 2210 is also moved slowly until it passes over the high points of the cams, whereupon the load and fire mechanism snaps it quickly to its opposite position, bringing the collar 216 against one or the other collars 241 to snap the rod 212 in one or the other direction quickly, thus to change the clutch connections to the shaft 87 quickly. It will be noted that the change from one to the other of these speeds is normally effected automatically by the cams 222 and 222a on the cam drum 88, but that if desired a shift from one to the other of these speeds may be produced by hand by manipulation of the handle 220.

On the cam drum 88 also is positioned a cam 250, which, when the machine cycle has been completed, engages a follower 251 (see Figures 4 and 12) and opens a switch at 252, interrupting the current to the motor 5 so that the machine stops. This interruption of the current to the motor 5 also interrupts current to a brake release solenoid 253 (see Figures 7 and 12) which permits a spring 254 (Figure 7) to press a pair of shoes 255 and 256 against the periphery of the brake drum 8. As shown these shoes 255 and 256 are carried by two pairs of lever arms 257 and 258 hinged at their lower ends to a base member 259. The arms 257 have pivoted therebetween at 260 a bell crank lever 261. The arm 262 of the lever 261 is secured to a rod 264. On this rod is positioned the spring 254 reacting between the abutment 263 bridging the back faces of the arms 257 and a nut 265 threaded on the rear end of the rod 264. This rod 264 is adjustably and pivotally secured to and between the upper ends of the arms 258. The long arm 266 of the lever 261 extends over the top of the solenoid core 267 of the solenoid 253 and a stirrup 268 passes over the arm 266 and secures it to this core. When the solenoid 253 is energized, which is shown as accomplished in Figure 12 by energy derived from two of the phase lines 270 and 271 of the supply to the motor 5, the core 267 is drawn downwardly, and the arms 257 and 258 are separated to release the brake shoes from the drum. When, however, the solenoid 253 is de-energized, as shown, the current supply to the motor 5 is cut off, the spring 254 lifts the arm 266 and the core 267 and draws these brake shoes against the periphery of the drum 8 and stops the rotation of the motor shaft 7.

A wiring diagram for this motor and brake control is shown in Figure 12. At 280, 281 and 282 are shown three-phase power lines leading to the three pole switch at 283, which is normally held closed during the operation of the machine by the energization of a holding solenoid 284. After passing through the switch at 283, the lines 280 and 282 are shown as passing to the overload circuit breakers 285 and 286, from which current passes through the lines 270 and 273 to the motor 5. The central line 281 is shown as passing directly through the switch 283 to the motor line 271. The solenoid 284 is shown as connected through the line 290 to one of the terminals of a stop button 291. The other terminal of the solenoid 284 passes through the line 292 to the power line 281. On the opposite side of the stop button 291 is a connection through the line 293 to one side of the starter button 294, the other side of which connects through the line 295 to the power line 282. This power line also connects through the line 297, through a switch 298 controlled by the solenoid 284, and through the line 299 to the stop switch 252, and through the line 300 to a switch at 301. The other side of this switch 301 is connected through the line 302 to the line 293.

Assuming that the switch 301 is closed, momentary depression of the starter button 294 closes a circuit to the solenoid 284 through the line 290, stop button 291, and back to the starting button through line 295 to the power line 282, and from the other side of the solenoid 284 through line 292 to the power line 281. This causes the switches 283 and 298 to be closed, starting the motor 5 and closing through the switch 298 a circuit through the switch 252, the switch 301, the stop switch 291 and the line 290, so that when the starter button 294 is released current still continues to flow through the solenoid 284 and the motor 5 continues to run. By pressing on the stop button 291 after the button 294 has been released, the current through the holding solenoid 284 is interrupted and the switches 283 and 298 are opened, as by the spring 305, thus interrupting current to the motor 5 and causing it to stop and the brake to be applied. This is the normal arrangement with the switch 301 closed so that the machine is started by pressing on the starter button momentarily, and is stopped, should this be desired before the completion of the cycle of operation of the machine, by pressing the stop button 291. Should the stop button remain untouched, the switch 252 is opened at the end of the cycle of operations, thus automatically stopping the motor, since it breaks the connection to the solenoid 284.

Many times, however, as when setting up the machine for a particular cycle of operations, it is desirable to turn the machine over slightly by power. When this is desired, the switch 301 is opened, whereupon the motor may be started by pressing the starter button 294 as before, but as the switch 298 can no longer continue to pass current through the solenoid 284 through the switch 301, release of this starter button immediately breaks the current through the solenoid 284 and the motor stops. Thus by opening the switch 301, which may be termed the "jog switch", the motor will operate only so long as the starter button is held depressed.

In some cases also it is desired to turn the cam drum over by hand. When this is desired a hand crank is placed on the squared forward end of the drum drive shaft 87. On disengaging the high speed clutch 169 and moving the pinion 211 out of mesh with the gear 198, the shaft 87 may be turned over by turning the hand crank. The work spindle may also be turned by hand, as, for example, to facilitate access of a wrench to close or open a chuck or other work holder carried thereby, while the magnetic brake is held released by holding in depressed position a pin 320 which passes through the cover member 321 of the headstock and engages at its lower end on the brake arm 266. Release of the pressure on the pin 320 permits it to be returned to inoperative position as by the action of the leaf spring 322, which is shown as having one end engaging the lower portion of the pin, and its other end secured to the cover 321 by any suitable means as at 324, and the spring 254 then applies the brake. The start and stop buttons and the jog switches 294, 291 and 301, respectively, may be arranged in a panel as at 325 on the forward face of the headstock convenient to the operator as shown in Figure 1.

From the foregoing description of an embodiment of this invention it should be evident to those skilled in the art that various changes and modifications might be made without departing from the spirit or scope of this invention as defined by the appended claims.

I claim:

1. In a machine of the class described, a bed, a headstock carried by said bed, a spindle journaled in said headstock, a motor having a casing secured to the end of said headstock and having a shaft extending into said headstock substantially parallel to said spindle, a train of gearing from said shaft to said spindle, a spring-applied-power-released brake on said shaft within said headstock connected for power energization when said motor is energized, and a brake-release member extending outwardly of said headstock where it may be actuated to release said brake while said motor is de-energized.

2. A machine of the class described comprising a bed, a headstock on said bed, a work spindle journaled in said headstock, a drive shaft in said headstock, a spring-applied brake within said headstock for said drive shaft, a lever in said headstock movable to release said brake, and a stem engaging said lever and projecting outwardly of said headstock accessible to the operator and actuable to depress said lever and release said brake.

3. A machine of the class described comprising a bed, a headstock on said bed, a work spindle journaled in said headstock, a drive shaft in said headstock, a spring-applied brake within said headstock for said drive shaft, a lever in said headstock movable to release said brake, magnetic means in said headstock energizable to depress said lever, and a stem engaging said lever and projecting outwardly of said headstock accessible to the operator and actuable to depress said lever and release said brake.

4. A machine of the class described, comprising a bed, a headstock on said bed, a work spindle journaled in said headstock, a drive shaft in said headstock, a spring-applied brake within said headstock for said drive shaft, a lever in said headstock movable to release said brake, magnetic means in said headstock energizable to depress said lever, a stem engaging said lever and projecting outwardly of said headstock accessible to the operator and actuable to depress said lever and release said brake, and a spring normally holding said stem out of lever-depressed position.

5. A machine of the class described, comprising a bed, a headstock on said bed, a rotary spindle carried by said headstock, a tool carrier, means including a rotary cam drum for moving and controlling said carrier, means for rotating said cam drum including a shaft having a portion to which a handle may be attached, a motor driving said spindle and drive shaft, a brake for said motor, means for automatically applying said brake when said motor is de-energized, and means actuable to release said brake when said motor is deenergized to permit said shaft to be rotated by said handle.

6. A machine of the class described, comprising a bed, a headstock on said bed, a rotary spindle in said headstock, a tool carrier movable relative to work carried by said spindle, means moving and controlling said carriers, means including an electric motor driving said spindle and said carrier-moving means, and an electrically released brake for stopping said driving means energized to release when said motor is energized, manual means for starting said motor, automatic means de-energizing said motor at the end of a machine cycle, and manual means for stopping said motor at any time during such cycle.

7. A machine of the class described, comprising a bed, a headstock on said bed, a spindle journaled in said headstock, a drive shaft journaled in said headstock, a motor connected to said drive shaft, driving connections from said drive shaft to said spindle, a tool carrier, means including a rotary cam drum below said headstock, a drum-driving shaft extending transversely of said bed driving said drum and having an end portion to which a handle may be attached, selective driving connections to said drum-driving shaft from said drive shaft and from said spindle, a brake for said drive shaft automatically stopping the rotation of said shaft when said motor is de-energized, and means actuable to release said brake and permit turning of said drum drive shaft by said handle.

8. A machine of the class described, comprising a bed, a headstock on said bed, a rotary spindle in said headstock, a tool carrier movable relative to work carried by said spindle, means moving and controlling said carrier and defining a cycle of movement thereof, a motor for rotating said spindle and actuating said carrier-moving means, means including a push button depressible to start said motor and normally ineffective on said motor when released, a member actuable to de-energize said motor, and means selectively effective to render said member inoperative and to cause release of said push button to de-energize said motor.

9. A machine of the class described, comprising a bed, a headstock on said bed, a rotary spindle in said headstock, a tool carrier movable relative to work carried by said spindle, means moving and controlling said carrier and defining a cycle of movement thereof, a motor for rotating said spindle and actuating said carrier-moving means, means including a push button depressible to start said motor and normally ineffective on said motor when released, a member actuable to de-energize said motor, means selectively effective to render said member inoperative so as to cause release of said push button to de-energize said motor, and means for automatically de-energizing said motor on the completion of said cycle of movement.

10. A machine of the class described, comprising a bed, a headstock on said bed, a rotary spindle in said headstock, a tool carrier movable relative to work carried by said spindle, means moving and controlling said carrier and defining a cycle of movement thereof, a motor for rotating said spindle and actuating said carrier-moving means, means including a push button depressible to start said motor and normally ineffective on said motor when released, a member actuable to de-energize said motor, means selectively effective to render said member inoperative so as to cause release of said push button to de-energize said motor, means for automatically de-energizing said motor on the completion of said cycle of movement, and means for stopping said motor effective on de-energization of said motor.

JOHN E. LOVELY.